United States Patent
Mohammad et al.

(10) Patent No.: US 8,103,011 B2
(45) Date of Patent: Jan. 24, 2012

(54) SIGNAL DETECTION USING MULTIPLE DETECTORS

(75) Inventors: Asif Iqbal Mohammad, Rolla, MO (US); Jack W. Stokes, III, North Bend, WA (US); John C. Platt, Bellevue, WA (US); Arungunram C. Surendran, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1245 days.

(21) Appl. No.: 11/669,549

(22) Filed: Jan. 31, 2007

(65) Prior Publication Data

US 2008/0181420 A1 Jul. 31, 2008

(51) Int. Cl.
*H04B 3/20* (2006.01)
*H04B 1/38* (2006.01)
*A61F 11/06* (2006.01)
*G06F 17/10* (2006.01)
*H04M 9/08* (2006.01)

(52) U.S. Cl. .. 381/66; 381/71.11; 708/322; 379/406.04; 370/287; 455/570

(58) Field of Classification Search ............... 379/372, 379/373.05, 376.02, 211.01–214.01, 455, 379/418
See application file for complete search history.

(56) References Cited

U.S. PATENT DOCUMENTS

| | | | | |
|---|---|---|---|---|
| 6,049,606 A * | 4/2000 | Ding et al. | | 379/406.08 |
| 6,707,910 B1 * | 3/2004 | Valve et al. | | 379/388.06 |
| 2002/0169602 A1 * | 11/2002 | Hodges | | 704/211 |
| 2005/0091050 A1 * | 4/2005 | Surendran et al. | | 704/226 |
| 2005/0129226 A1 * | 6/2005 | Piket et al. | | 379/406.01 |
| 2008/0181420 A1 * | 7/2008 | Mohammad et al. | | 381/66 |

OTHER PUBLICATIONS

Simon Haykin, Adaptive Digital Communication Receivers, Dec. 2000, IEEE Communications Magazine, 106-112.*
S. Haykin. Adaptive Filter Theory, Prentice Hall, Englewood Cliffs, NJ, 1991. Last accessed Jan. 31, 2007, 2 pages.
Hua Ye, et al. "A new double-talk detection algorithm based on the orthogonality theorem," IEEE Trans. on Comm., vol. 39, pp. 1542-1545, Nov. 1991. Last accessed Dec. 26, 2006, 4 pages.
B. Porat. "Second-order equivalence of rectangular and exponential windows in least-squares estimation of autoregressive processes," IEEE Trans. on Acoustics, Speech and Signal Processing, vol. ASSP-33, No. 4, Oct. 1985 http://ieeexplore.ieee.org/iel6/29/26193/01164685.pdf?tp=&arnumber=1164685&isnumber=26193. Last accessed Jan. 7, 2008, 4 pages.
Mohammad Asif Iqbal, et al. "Doubletalk detection using real time recurrent learning," in IWAENC, Paris, France, Sep. 2006. http://research.microsoft.com/~acsuren/doubletalk.pdf. Last accessed Jan. 7, 2008, 5 pages.

(Continued)

*Primary Examiner* — Fan Tsang
*Assistant Examiner* — Jeffrey Lytle
(74) *Attorney, Agent, or Firm* — Lee & Hayes, PLLC

(57) ABSTRACT

Signal detectors are described herein. By way of example, a system for detecting signals can include a microphone signal detector, a loudspeaker signal detector, a signal discriminator and a decision component. When the microphone signal detector detects the presence of a microphone signal, the loudspeaker signal detector detects the presence of a loudspeaker signal and the signal discriminator determines that near-end speech dominates loudspeaker echo, the decision component can confirm the presence of doubletalk. When the microphone signal detector detects the presence of a microphone signal and the signal discriminator determines that near-end speech dominates loudspeaker echo, the decision component confirms the presence of near-end signal.

20 Claims, 12 Drawing Sheets

OTHER PUBLICATIONS

Benesty, et al. "A new class of doubletalk detectors based on crosscorrelation," IEEE Trans. on Sp. and Au. Proc., vol. 8, pp. 168-172, Mar. 2000. S1063-6676(00)01723-5. Last accessed Dec. 26, 2006, 5 pages.

Surendran, et al. "Logistic discriminative speech detectors using posterior snr," in Proceedings of the 2004 IEEE ICASSP, Montreal, Canada, May 2004, pp. 625-628. Last accessed Dec. 26, 2006, 4 pages.

Cutler. "The distributed meetings system," in Proceedings of the 2003 IEEE ICASSP, Hong Kong, China, Apr. 2003, pp. 756-759. 0-7803-7663-3/03. Last accessed Dec. 26, 2006, 4 pages.

Martin. "Spectral subtraction based on minimum statistics," in Proceedings of the 7th European Signal Processing Conference, Edinburgh, Scotland, Sep. 1994, pp. 1182-1185. Last accessed Dec. 26, 2006, 4 pages.

Cho, et al. "An objective technique for evaluating doubletalk detectors in acoustic echo cancelers," IEEE Trans. on Sp. and Au. Proc., vol. 7, pp. 718-724, Nov. 1999. Last accessed Dec. 26, 2006, 7 pages.

Bishop. Neural Networks for Pattern Recognition. Oxford University Press.

Cohen, et al. Speech enhancement for non-stationary noise environments. In Signal Processing 81, pp. 2403-2418, 2001. Last accessed Dec. 26, 2006, 16 pages.

Pearce, et al. The aurora experimental framework. In Proceedings of the 6th International Conference on Spoken Language Processing, pp. 16-20, Beijing, China, Oct. 2000. Last accessed Dec. 26, 2006, 4 pages.

\* cited by examiner

SIGNAL DETECTION USING MULTIPLE DETECTORS

BACKGROUND

Acoustic echo cancellation (AEC) algorithms are used to suppress the echo from a loudspeaker(s) that can be captured by a microphone(s) located in close proximity. Typically, AEC is used during full-duplex communication between someone located in a near-end room speaking with another person located remotely in a far-end room. When the far-end person speaks, their voice is played through the speakers in the near-end room. The echo from the far-end person's speech is then captured by the near-end microphone(s). Without AEC, the far-end speech echo would be transmitted back to the far-end and the far-end person would hear a delayed echo of their previous speech out of the speakers in the far-end room.

When far-end speech is played from loudspeakers located in the near-end room simultaneously when there is near-end speech, the condition is commonly referred to as doubletalk. If the coefficients for the AEC's adaptive filters are updated when there is any near-end speech or other transient acoustic signal in the near-end room or when there is doubletalk, the adaptive filters will converge in such a manner as to cancel part of the near-end speech in addition to the echo from the loudspeaker. Cancellation of the near-end speech leads to distortion of processed speech signal and should be avoided.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein facilitates communications by, for instance, detecting periods of simultaneous loudspeaker and near-end signal, periods of near-end speech in the presence or the absence of echo and/or periods of low probability of a loudspeaker signal. By stopping the adaptation of the filter coefficients when any near-end signal is present (e.g., speech, music, video game sounds, etc.), the performance of an AEC can be improved. Additionally or alternatively, the adaptation of the filter coefficients can be stopped when the probability of a loudspeaker signal being present is low.

By way of example, the subject matter includes combining information from different signal sources in order to make robust decisions even under changing noise conditions. The multiple signal detectors/discriminators employed can, for instance, utilize machine learning techniques (e.g., real time recurrent learning networks) in order to detect signals in the presence of background noise. In one example, three detectors can be used—two frequency domain signal detectors (one at the speaker and one at the microphone channel) and a third detector that determines the relative level of near-end signal vs. loudspeaker echo in the microphone signal in order to distinguish between the presence of a near-end signal and loudspeaker echo. These detectors can be used to disable adaptation of the filter coefficients when any near-end signal is present at the microphone (other than noise). Additionally or alternatively, adaptation of the filter coefficients can be disabled when the probability of a signal at the loudspeaker is low.

By way of another example, the detectors/discriminators can be based on a recurrent network that can be trained continuously in an online fashion after every frame of data arrives. The detector at the loudspeaker can employ, for instance, the logarithm of the estimated signal-to-noise ratio (SNR) of the loudspeaker signal to determine the loudspeaker signal detection (LSD) probability. To compute the LSD probability, the logarithms of the posterior loudspeaker signal SNR values for each frequency band can be used as feature inputs to a real time recurrent learning (RTRL) network. The LSD probability also can be computed for cases when the loudspeaker signal is generated or stored on a computer such as music or game sounds. Likewise, the logarithms of the posterior SNR for each frequency band of the microphone signal can be input to a RTRL network and used to determine the microphone signal detection (MSD) probability. Signal detection algorithms other than RTRL also can be used.

The signal discriminator (SD), which measures the relative influence of the near-end signal vs. the loudspeaker echo in the microphone signal, provides a probability that the microphone signal contains mostly near-end signal. Like the LSD and the MSD, the probability of near-end signal can be computed using RTRL for separate frequency bands. The feature inputs to the SD RTRL network can be the logarithms of the ratio of the microphone signal power to the loudspeaker signal power for each frequency band.

The three probabilities, LSD, MSD, and SD, then can be used to determine whether or not there is a near-end signal or doubletalk condition. When the MSD and the SD both indicate a high probability of the presence of signal (e.g., above selected thresholds) the presence of near-end signal, but not loudspeaker echo, can be declared. If the LSD also indicates the presence of signal, the current frame of the capture signal can be declared to be doubletalk. Adaptation of an AEC can be halted under either or both conditions. Additionally or alternatively, the probability of the LSD can be used to determine whether or not there is a loudspeaker signal and if this probability is low, adaptation of the AEC can be halted.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
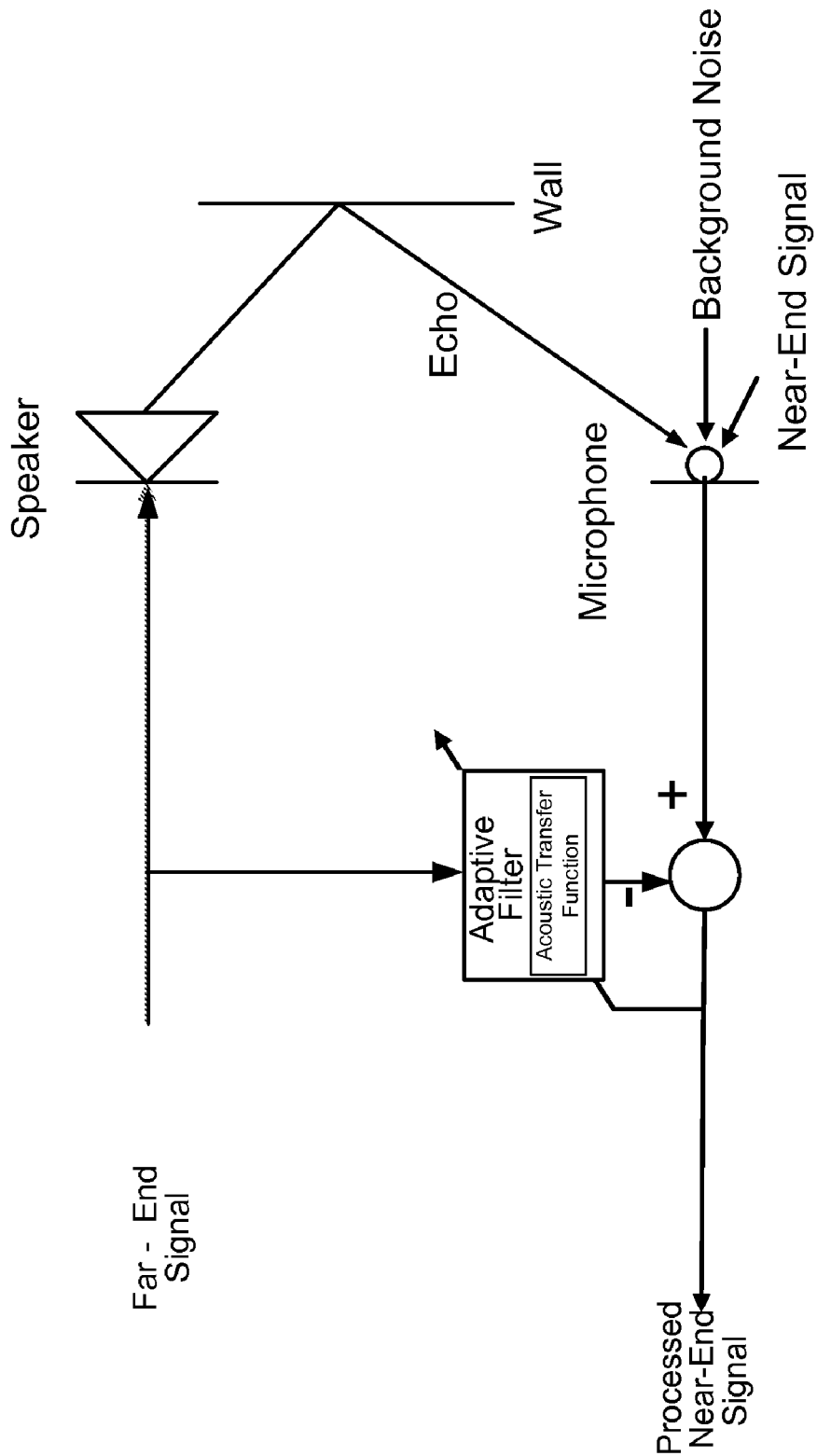
FIG. 1 schematically illustrates an acoustic echo canceller (AEC) implemented in the time domain.
Figure 2:
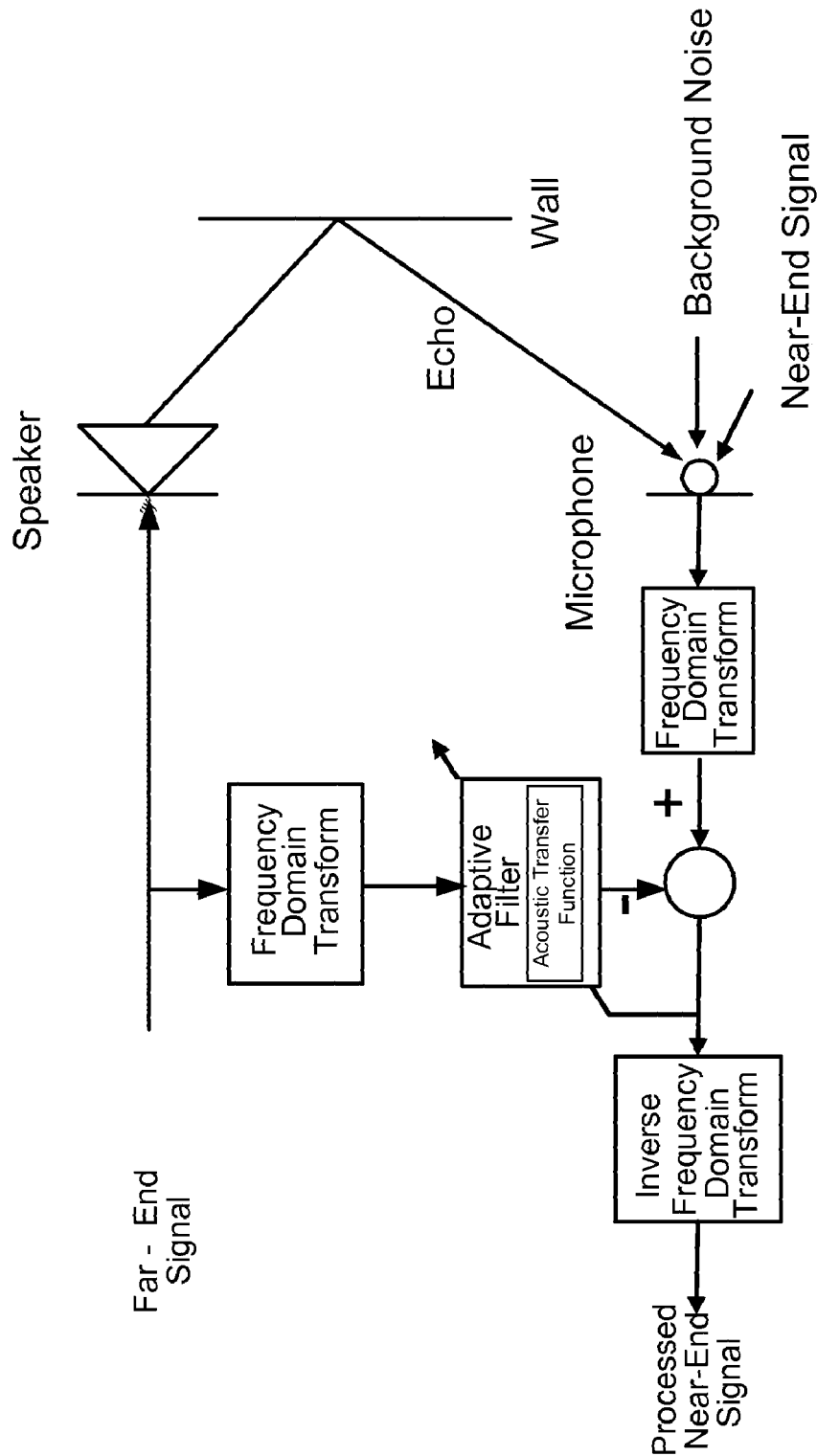
FIG. 2 schematically illustrates an acoustic echo canceller (AEC) implemented in the frequency domain.

Acoustic echo cancellers (AECs) are used in teleconferencing systems in order to mitigate the deleterious effects of acoustic feedback from the loudspeaker signal to the microphone signal. AEC also can be used for speech recognition to cancel the echo when a sound is played through the speaker (s). The microphone signal may be composed of a near-end signal such as speech produced by a human or music produced by a radio in the near-end room, echo generated by the loudspeaker(s), and background noise (see FIGS. 1 and 2). AEC algorithms are typically implemented using adaptive filters that model the impulse response of a near-end room. A typical AEC adaptively models the echo path using a filter, synthesizes a replica of the echo and subtracts the replica from the echo-corrupted microphone signal. The AEC adaptive filters can be implemented in the time domain (see FIG. 1) and the frequency domain (see FIG. 2).

The performance of an AEC can be improved by stopping the adaptation of the filter coefficients when any near-end signal (e.g. speech, music) is present and/or during periods of simultaneous loudspeaker signal (e.g., speech, music, video game sounds) and near-end signal (e.g., speech, music). A signal detector can use statistics (e.g., a cross-correlation based statistic) computed from either or both the microphone signal and the loudspeaker signal and/or statistics based on each individual signal to assist in the detection.

By way of example, multiple signal detectors/discriminators (D/D) based on a machine-learning approach can be used at various points and combined to detect doubletalk and/or distinguish near-end signal from the loudspeaker echo. By way of another example, the detectors can employ signal-to-noise ratio (SNR) dependent features to ensure that the detector is robust to changing noise conditions, effective for signal detection, and can be easily tracked online in the presence of noise. These detectors can be used to improve voice communications and AEC algorithms for a wide variety of applications (e.g., WINDOWS operating systems, WINDOWS MESSENGER, MSN MESSENGER, AUTO PC, etc.).

Figure 3:
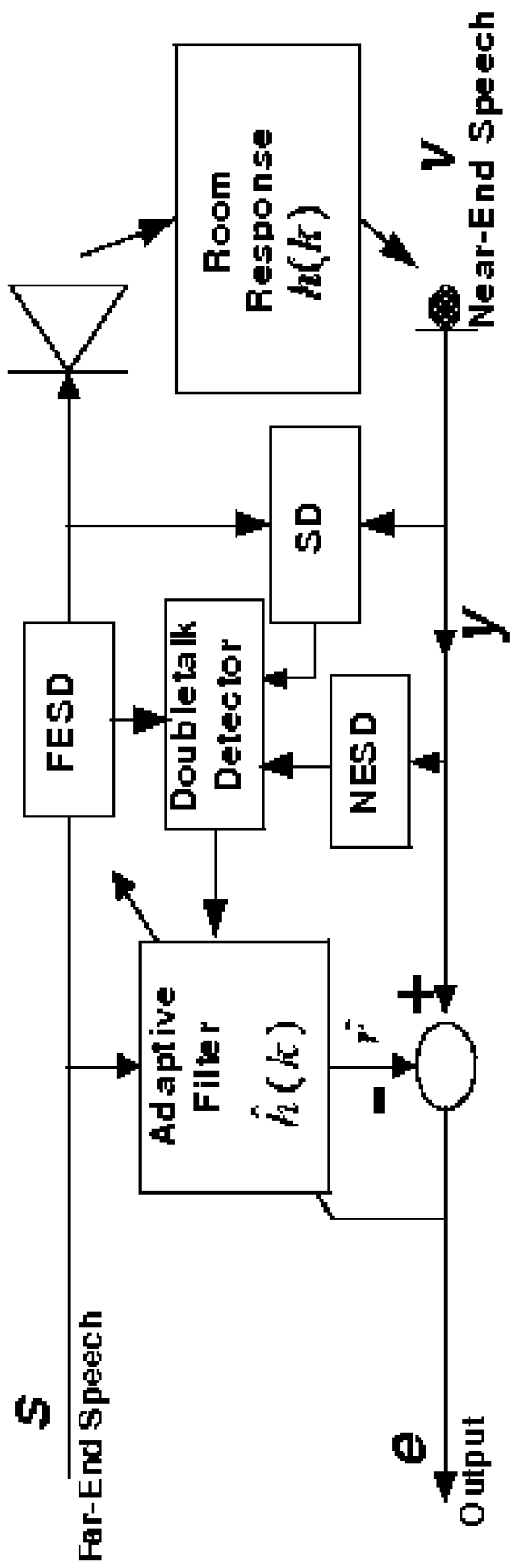
FIG. 3 is a block diagram of one example of a system for detecting signals.

One example of a multiple detector configuration includes three different D/D units. Signal detectors can be used to detect the presence of a signal at the loudspeaker (LSD) and at the microphone (MSD) as shown in FIG. 3. Since at the microphone(s) the signal can be due to near-end signal or due to echo from the loudspeaker(s), a third unit (referred to as a signal discriminator (SD)) can be employed to estimate the relative influence of loudspeaker echo vs. the near-end signal at the microphone. The outputs of all three D/D units can be combined to make a robust decision regarding doubletalk in order to determine whether to halt adaptive filter algorithms (e.g., any suitable type such as least mean squares (LMS) or normalized least mean squares (NLMS)). Additionally or alternatively, the outputs of MSD and SD can be combined to make a robust decision regarding the near-end signal to determine whether to halt the adaptive algorithms. Additionally or alternatively, the output of the LSD can be used to make a decision regarding the loudspeaker signal to determine whether to halt the adaptive algorithms.

Signal Detector/Discriminator Design Considerations

Figure 4:
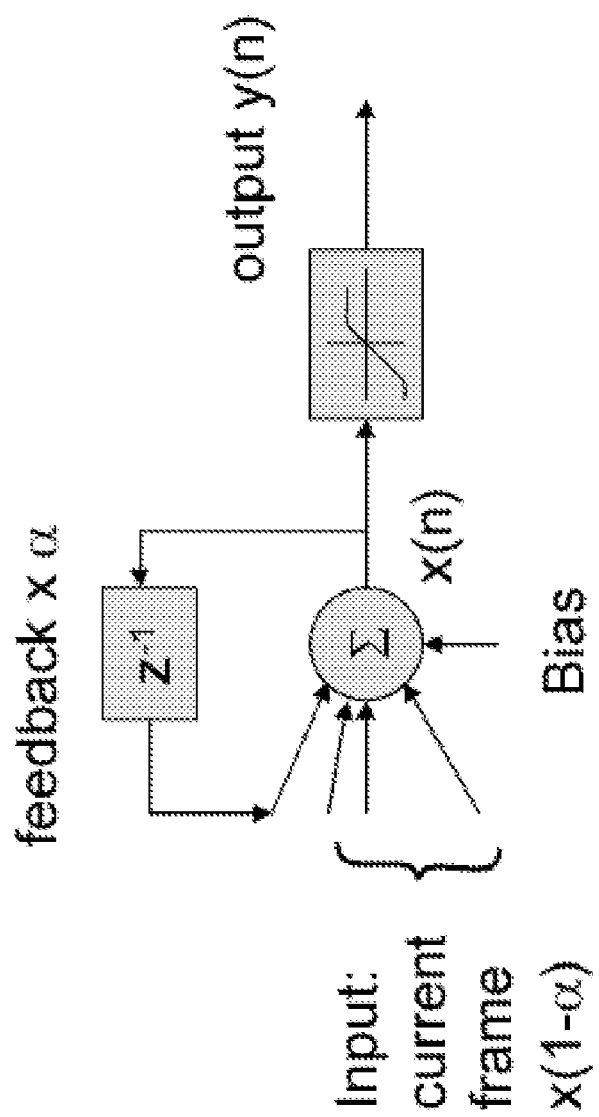
FIG. 4 is a block diagram of one example of a recurrent network architecture.

Speech and music are highly correlated signals and are influenced by reverberation, which typically lasts for hundreds of milliseconds. One way to incorporate this long-term effect automatically is to take multiple frames of data spanning the desired time-length of interest and use them as inputs to a logistic network. Another option is to use past decisions rather than features such as by using a recurrent network that dynamically re-uses information about the state of the network from the past (e.g., the previous outputs of the network) as an input to the current decision. Yet another option combines these ideas and uses a single layer network with recurrent feedback, an example of which is schematically shown in FIG. 4. The state space model of such a system can be written as:

$$x(n) = (1-\alpha)\left(\sum_{i=1}^{N} w_i u_i\right) + \alpha x(n-1)$$

$$y(n) = \frac{1}{1+\exp(-x(n))}$$

where $[u_1(n)u_2(n)\ldots u_{N-1}(n)]$ is the current input data, $w_i$s and $\alpha$ are the parameters of the system and $y(n)$ is a value between 0 and 1, and hence can be interpreted as a probability.

Since the input features are time-dependent and arrive one per time-segment, such a network can be trained continuously in an on-line fashion after every frame of data arrives. This type of learning can be used for a non-stationary signal like speech and is referred to as real-time recurrent learning (RTRL). RTRL can employ stochastic gradient descent to train a network in order to minimize the cross-entropy error. Using such an error metric makes the network discriminative and provides the maximum likelihood estimate of the class probability for a wide variety of class conditional densities of the data. Since the outputs represent probabilities, this facilitates decision making as well as the combination of decisions.

Feature Design

It is desirable for a detector's features to be simple and easy to calculate, to have discriminatory power and to work well under changing noise conditions. By way of example, the estimated posterior SNR $\chi(k, t)$ can be used as the feature set for a microphone signal detector (MSD) and a loudspeaker signal detector (LSD). The estimated posterior SNR $\chi(k, t)$ is the ratio of the energy in a given target time-frequency atom A to the noise energy N $$\chi(k,t) = \frac{|A(k,t)|^2}{N(k,t)}$$

where k, t are the frequency bin and time indices respectively. The LSD can use the loudspeaker signal S as the target signal and the MSD can use the microphone signal Y. Since the short term spectra of speech are modeled well by log-normal distributions, the logarithm of the SNR estimate rather than the SNR estimate itself can be used as the inputs:

$$\chi_{LSD}(k,t) = \{\log|S(k,t)|^2 - \log N_S(k,t)\}$$

and $$\chi_{MSD}(k,t) = \{\log|Y(k,t)|^2 - \log N_Y(k,t)\}$$

where $N_S$ and $N_Y$ are the noise energies in frequency bin k and time-frame t of the loudspeaker and microphone signals, respectively. The noise power N can be tracked using any suitable algorithm such as by tracking the noise floor using a minima tracker (looking back a few frames (e.g., 25) for each frequency bin and choosing the lowest value of the signal) followed by smoothing. Examples of noise tracking algorithms are described in Israel Cohen and Baruch Berdugo, "Speech Enhancement for Non-stationary Noise Environments," *Signal Processing* 81, pp 2403-2418 (2001) and R. Martin, "Spectral Subtraction Based on Minimum Statistics," Proceedings of the 7th European Signal Processing Conference, September 1994, pp. 1182-1185.

The signal discriminator (SD) can be designed to determine how much of the microphone signal is dominated by the near-end signal as opposed to the loudspeaker echo such that the SD discriminates the level of near-end signal. To accomplish this, the logarithm of the ratio of the instantaneous power of the microphone signal Y to the instantaneous power of the loudspeaker signal S for each frequency bin per frame can be used as the input feature:

$$\chi_{SD}(k,t) = \log|Y(k,t)|^2 - \log|S(k,t)|^2. \quad (5)$$

Figure 5:
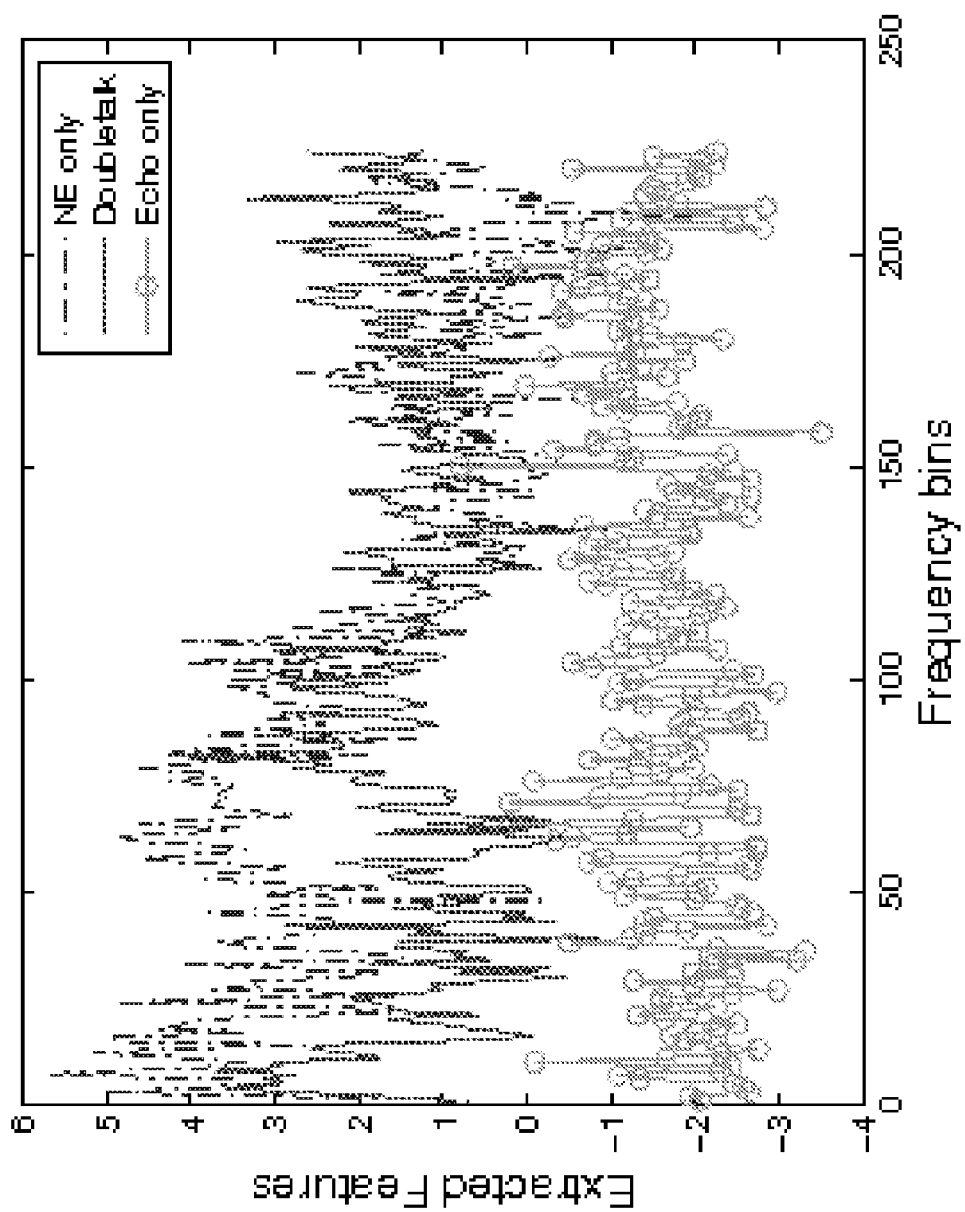
FIG. 5 is a diagram showing extracted features from a signal discriminator.

As shown in FIG. 5, the extracted features are clearly distinct for different scenarios. As expected, the extracted features are typically largest for only the near-end signal (e.g. speech), smallest for the loudspeaker echo-only case, and in between for the case of doubletalk. Different feature levels correspond to different probability levels with larger features corresponding to higher probabilities. For the loudspeaker echo-only case, the extracted features are always low independent of the echo-path; hence the discriminator performance is relatively independent of the echo-path. This has been verified empirically under a wide variety of situations.

The decision from the SD discriminator can be combined with decisions from the MSD and the LSD for near-end signal detection and doubletalk detection. When the MSD indicates a high probability of the presence of signal in the microphone input rather than noise (e.g., the MSD probability is above its selected threshold) and the SD indicates a relatively high level of near-end signal relative to the echo (e.g., the SD probability is above its selected threshold), near-end signal is considered confirmed. If the LSD indicates the presence of loudspeaker signal and the MSD and SD indicate a confirmed near-end signal, the current frame of the microphone signal is declared to be doubletalk (e.g., all three detectors indicate a high probability above their respective thresholds). When doubletalk is declared and/or near signal is declared, the adaptation of the filters can be halted. Additionally or alternatively, if the LSD indicates that there is no or a low probability of loudspeaker signal, the adaptation of the filters can be halted.

By way of another example, a learner that combines all these three decisions into one can be used. For example, a RTRL network can be trained to indicate the presence of a near-end signal when the input features for the network are the outputs of the MSD and SD networks. In another example, a RTRL network can be trained to indicate the presence of doubletalk when the input features for the network are the output of the MSD, LSD, and SD networks.

Experimental Results

Data from the AURORA database was used to conduct experiments. The recorded digital speech was sampled at 16 KHz and was used for the loudspeaker signal s and the near-end signal v shown in FIG. 3. The room impulse response of a 10'×10'×8' room was measured using a stereo system. The truncated 8000 sample (500 ms) room response was used as the loudspeaker-microphone environment h shown in FIG. 3. A subset of the Aurora database (75 signals (50000 frames) consisting of a mixture of male and female speakers) was used for training the LSD. These signals were filtered through the left channel of the measured room impulse response to create the echo part of the microphone signals. Near-end speech signals (different signals taken from the Aurora database) were added to the left channel echo to simulate the microphone signals for training the MSD and the SD. Near-end speech signals were added at different near-end to far-end ratios to improve training.

For testing, a different set of 120 signals was taken from the Aurora data-base to simulate the loudspeaker speech signals. These signals were filtered using the right channel of the measured room impulse response to simulate a different channel for testing. Near-end speech signals from a second different set of 120 signals taken from the Aurora database at 12 different near-end to far-end ratios (NFR) were added to these artificially created echo signals. Thus, ten signals were used for testing at each NFR ratio where each signal is approximately 8-10 seconds long.

The true labels on the near-end speech signals were generated by thresholding the energy in each time frame of the clean data. The threshold was selected so that all the speech events were retained, which was verified by listening to a small fraction of the training data. Although the data described below was generated using a detector with a single microphone channel, any suitable detector can be used such as those that are modular in nature and thus, the techniques are extendable to multi-channel scenarios.

Figure 6:
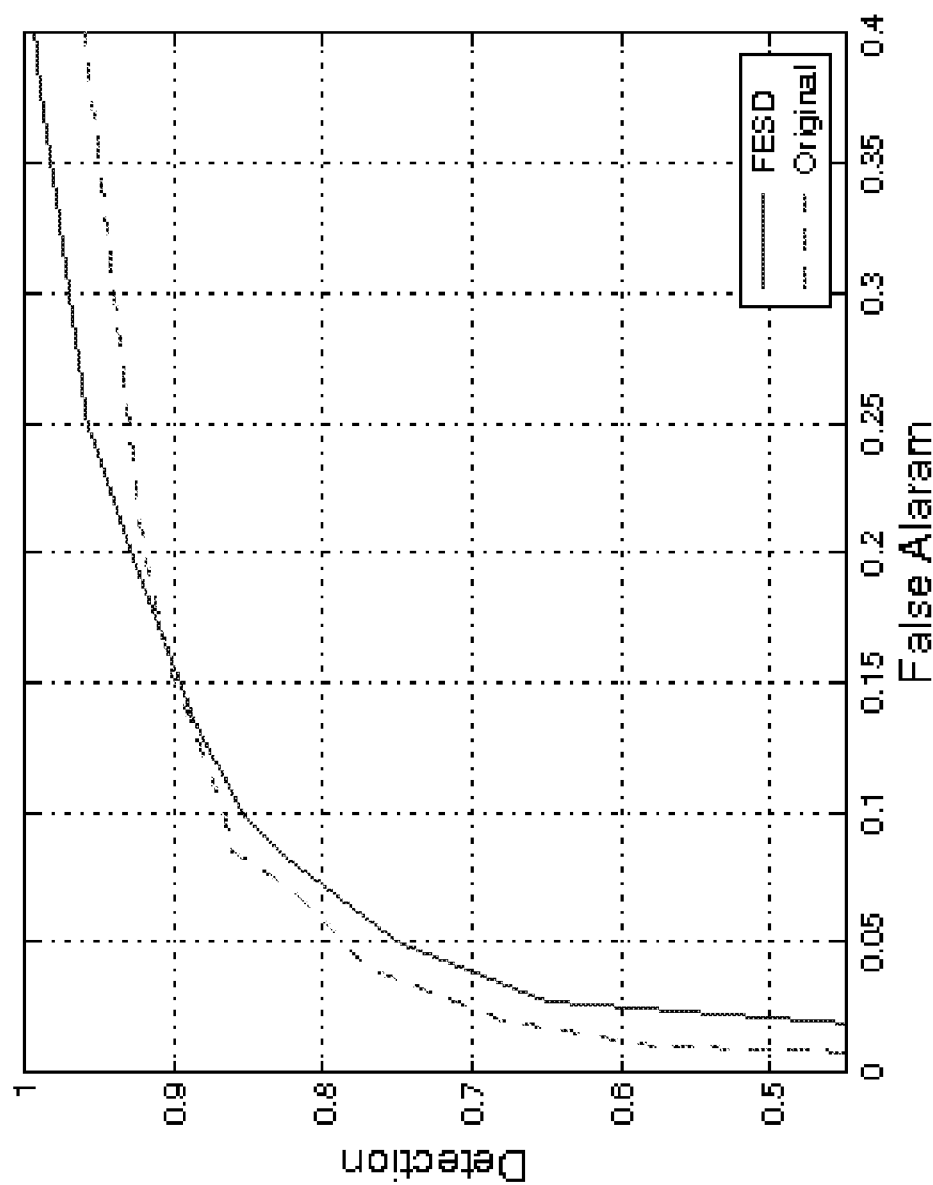
FIG. 6 is a Receiver Operating Characteristic (ROC) curve for one example of a loudspeaker signal detector.

To study the performance of the speech detectors, Receiver Operating Characteristic (ROC) curves were plotted (correct detection of near-end speech signal versus false alarm). As shown in FIG. 6, the results of the LSD were compatible with the speech detector (labeled "Original" in FIG. 6) described in Arun C. Surendran, Somsak Sukittanon and John Platt, "Logistic Discriminative Speech Detectors Using Posterior SNR," *Proceedings of the 2004 IEEE International Conference on Acoustics, Speech and Signal Processing,* May 2004, pp. 625-628, which was trained with 8 KHz sampled speech.

Figure 7:
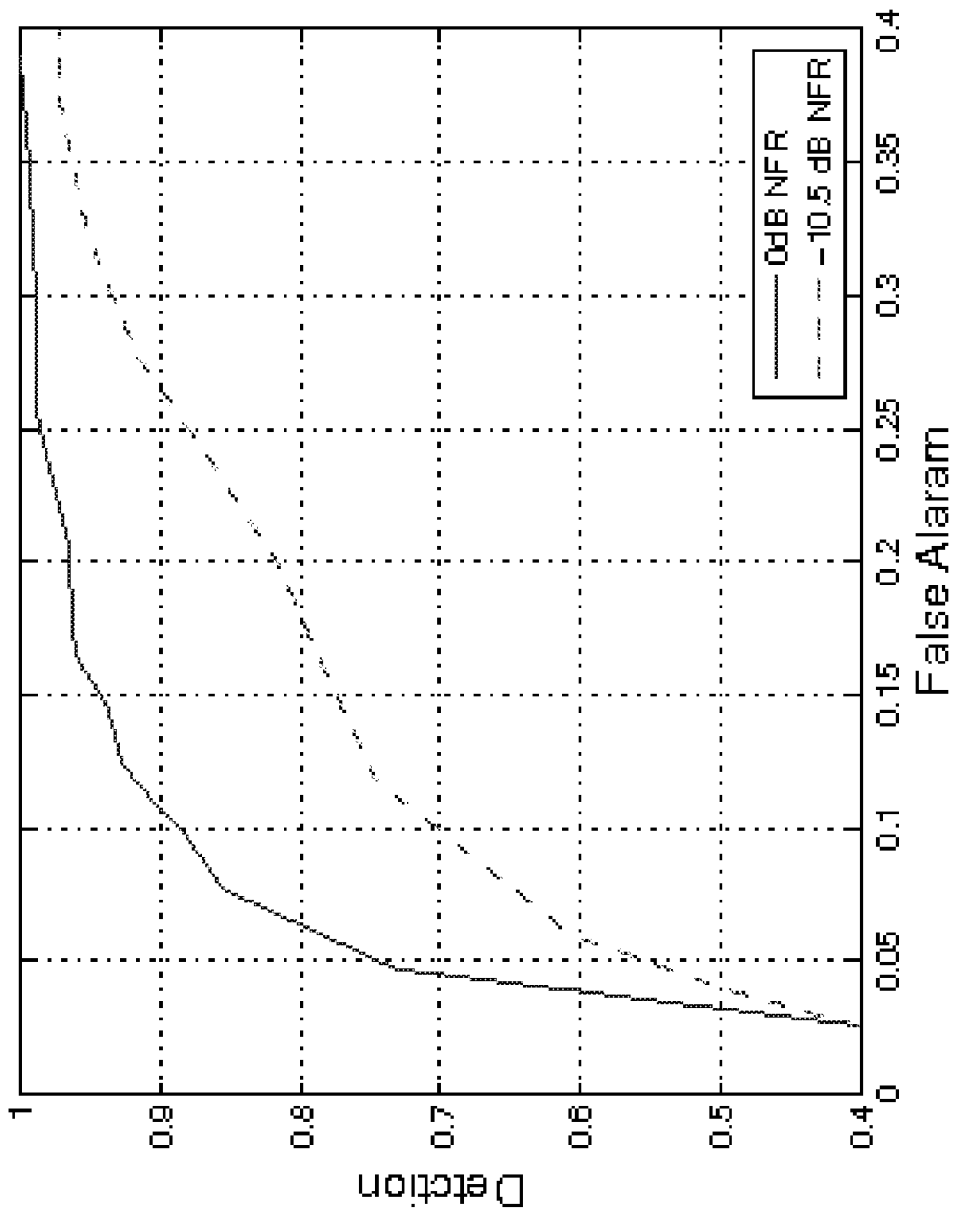
FIG. 7 is an ROC curve for one example of the combination of the MSD and SD.

As explained above, the system can confirm the presence of near-end speech when both the MSD and the SD indicate the presence of the near-end speech signal. The ROC curve for the combination of the MSD and the SD is shown in FIG. 7 at different values of NFR. At a false alarm rate of 0.1, the near-end speech is detected with a detection probability of 0.89 at 0 dB NFR. The near-end speech is detected with a lower detection rate of 0.7 at −10.5 dB NFR. There is a better detection rate at 0 dB as compared to −10.5 dB NFR. The axes are truncated to highlight the upper left quadrant of the plot.

The thresholds corresponding to $P_f=0.1$ (probability of false alarm=0.1) were obtained by:
 1. setting v=0 (no near-end speech);
 2. selecting thresholds for all the speech detectors;
 3. computing $P_f$;
 4. repeating steps 2, 3 over a range of threshold values; and
 5. selecting the thresholds that correspond to $P_f=0.1$.

These thresholds were used to compute the probability of miss, $P_m$ (the probability of not detecting doubletalk when it is present or false negative), for the test signals. For the ten signals at each NFR, the $P_m$ was averaged over the respective signals to calculate the average probability of miss, $P_m$. To evaluate the doubletalk detector, we used the technique described in Juan H. Cho, Dennis R. Morgan and Jacob Benesty, "An Objective Technique for Evaluating Doubletalk Detectors in Acoustic Echo Cancelers," *IEEE Transactions on Speech and Audio Processing,* November 1999, vol. 7, pp. 718-724. These results were compared with a normalized cross-correlation based detector described in Jacob Benesty, Dennis R. Morgan and Juan H. Cho, "A New Class of Doubletalk Detectors Based on Cross-Correlation," *IEEE Transactions on Speech and Audio Processing,* March 2000, vol. 9, pp. 168-172 and a conventional cross-correlation based detector described in Hua Ye and Bo-Xiu Wu, "A New Double-Talk Detection Algorithm Based on the Orthogonality Theorem," *IEEE Transactions on Communications*, November 1991, vol. 39, pp. 1542-1545.

Figure 8:
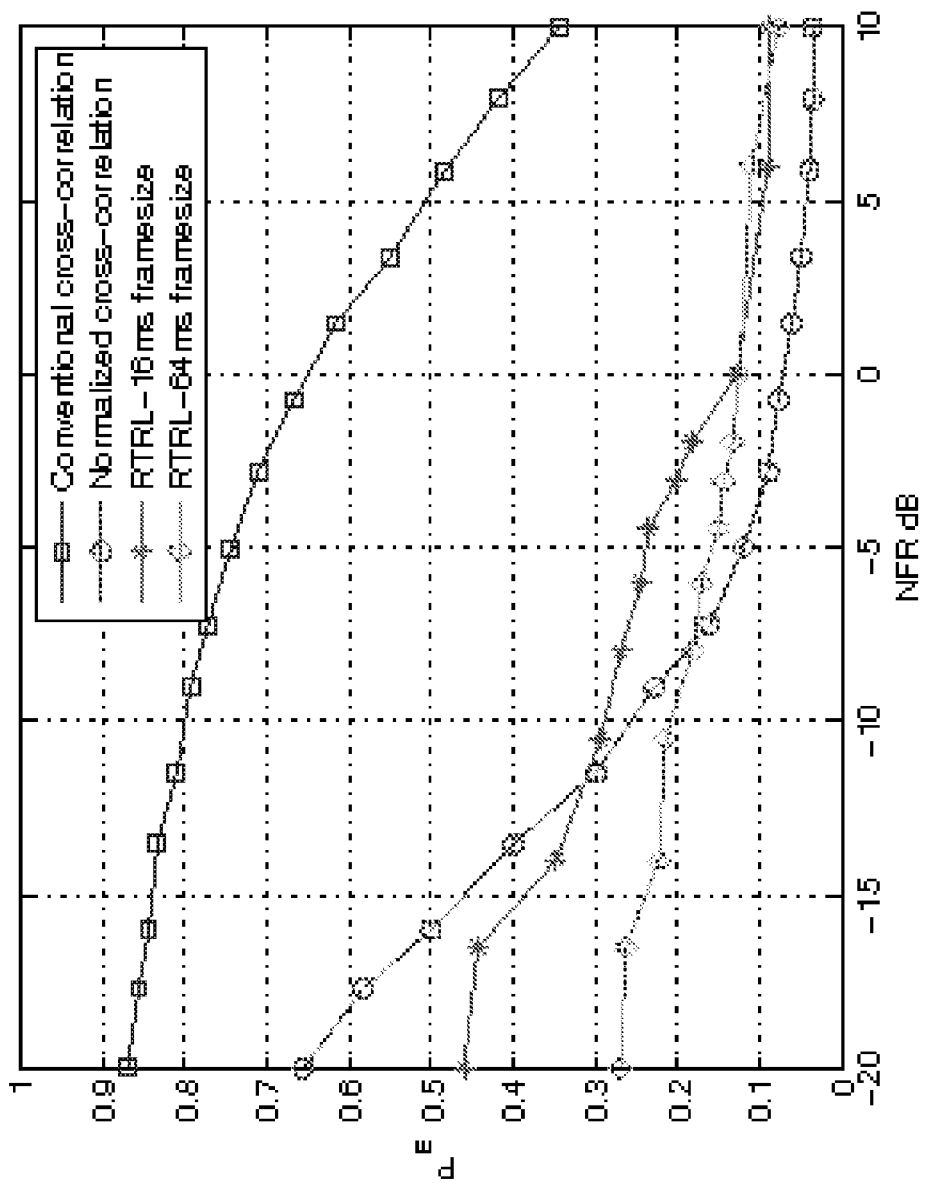
FIG. 8 is a graph showing the results of testing a Real Time Recurrent Learning Based doubletalk detector compared to doubletalk detectors using cross-correlation.

The $P_m$ characteristics of all three methods under the constraint of $P_f=0.1$ are shown in FIG. 8. The RTRL-based doubletalk detector outperformed the conventional cross-correlation based detector over a full range of NFR and the normalized cross-correlation based detector for lower values of NFR and was comparable over the remaining region.

These results were achieved with an RTRL-based doubletalk detector using a frame size of 16 ms (256 samples at 16 KHz) whereas the cross-correlation methods used a frame of size 62.5 ms (500 samples at 8 KHz). A bi-level architecture also was implemented by aggregating 4 frames into a single frame so as to have a frame of duration 64 ms comparable to that of the normalized cross-correlation based detector's 62.5 ms. As is shown in FIG. 8, the RTRL-based doubletalk detector outperformed the normalized cross-correlation based detector in almost half of the range of NFR values and performance was very close in the remaining region.

The LSD has a detection rate of 0.88 at 15 dB SNR (FIG. 6). Thus the RTRL-based doubletalk detector is bounded by a miss probability of 0.1 even at higher NFR values (FIG. 8). Typically, in a teleconferencing device such as the MICROSOFT RingCam (described in Ross Cutler, "The Distributed Meetings System," *Proceedings of the* 2003 *IEEE International Conference on Acoustics, Speech and Signal Processing*, April 2003, pp. 756-759) the loudspeaker is located very close to the microphone, and the near-end talkers are relatively further away from the microphone. Thus, these devices usually have low NFR values. As is shown in FIG. 8, an RTRL-based doubletalk detector significantly outperformed the normalized cross-correlation based detector over such lower NFR values making it suitable for use in such applications.

Figure 9:
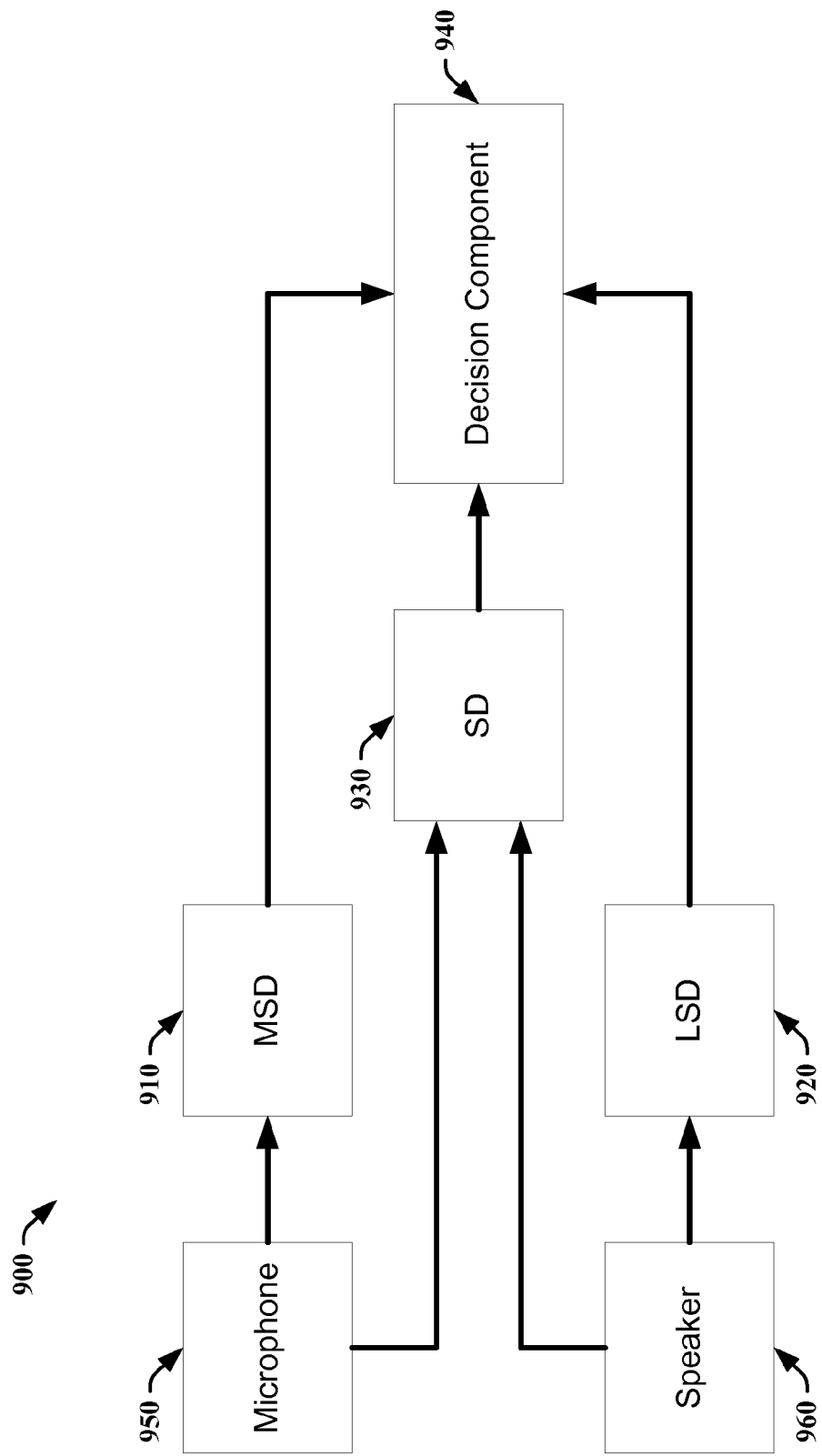
FIG. 9 is a block diagram of one example of a system for detecting signals.

FIG. 9 schematically illustrates one example of a system 900 for detecting signals. The system 900 includes a microphone signal detector 910, a loudspeaker signal detector 920, a signal discriminator 930 and a decision component 940. The microphone signal detector 910 can be configured to detect the presence of a microphone signal at a microphone 950. The loudspeaker signal detector 920 can be configured to detect the presence of a loudspeaker signal at a speaker 960. The signal discriminator 930 can be configured to determine the influence of the loudspeaker echo relative to the near-end signal at the microphone 950. The decision component 940 can be configured to confirm the presence of doubletalk at the microphone signal 950 by comparing the output of the signal detectors 910, 920, 930 to their threshold values. The decision component 940 can be further configured to confirm the presence of the near-end signal at the microphone 950 by comparing the output of the microphone signal detector 910 to its threshold value and the output of the signal discriminator 930 to its threshold value. The decision component 940 can be further configured to confirm a low probability of a loudspeaker signal at the speaker 960.

The detectors 910, 920, 930 and the decision component 940 can be implemented by software or combinations of software and hardware and can be the same process executing on a single or a plurality of microprocessor or multiple processes executing on a single or a plurality of microprocessors. The microphone signal detector 910, the loudspeaker signal detector 920 and the signal discriminator 930 can be implemented in any suitable manner such as those described above, for instance, each can be configured to base current decisions at least in part on their past state. One example of such an implementation is a network with recurrent feedback such as a real time recurrent learning (RTRL) network. A RTRL network can, for instance, employ stochastic gradient descent to train the network in order to minimize cross-entropy error. Moreover, the microphone and loudspeaker signal detectors can be, for example, frequency domain signal detectors.

The real time recurrent learning networks implementing the signal detectors 910, 920 can receive any suitable input, such as signal features (e.g., features relating to the logarithm of the estimated posterior signal-to-noise ratio (SNR) as described above). By way of example, in order to determine the SNR, the noise floor can be tracked using any suitable technique, for instance, by using a minima tracker (e.g., as described above such as by tracking the noise floor by looking back a few frames (e.g., 25) for each frequency bin and choosing the lowest value of the signal followed by smoothing). The signal discriminator 930 can receive any suitable input, such as an input relating to a logarithm of the ratio of the microphone power to the loudspeaker power.

Figure 10:
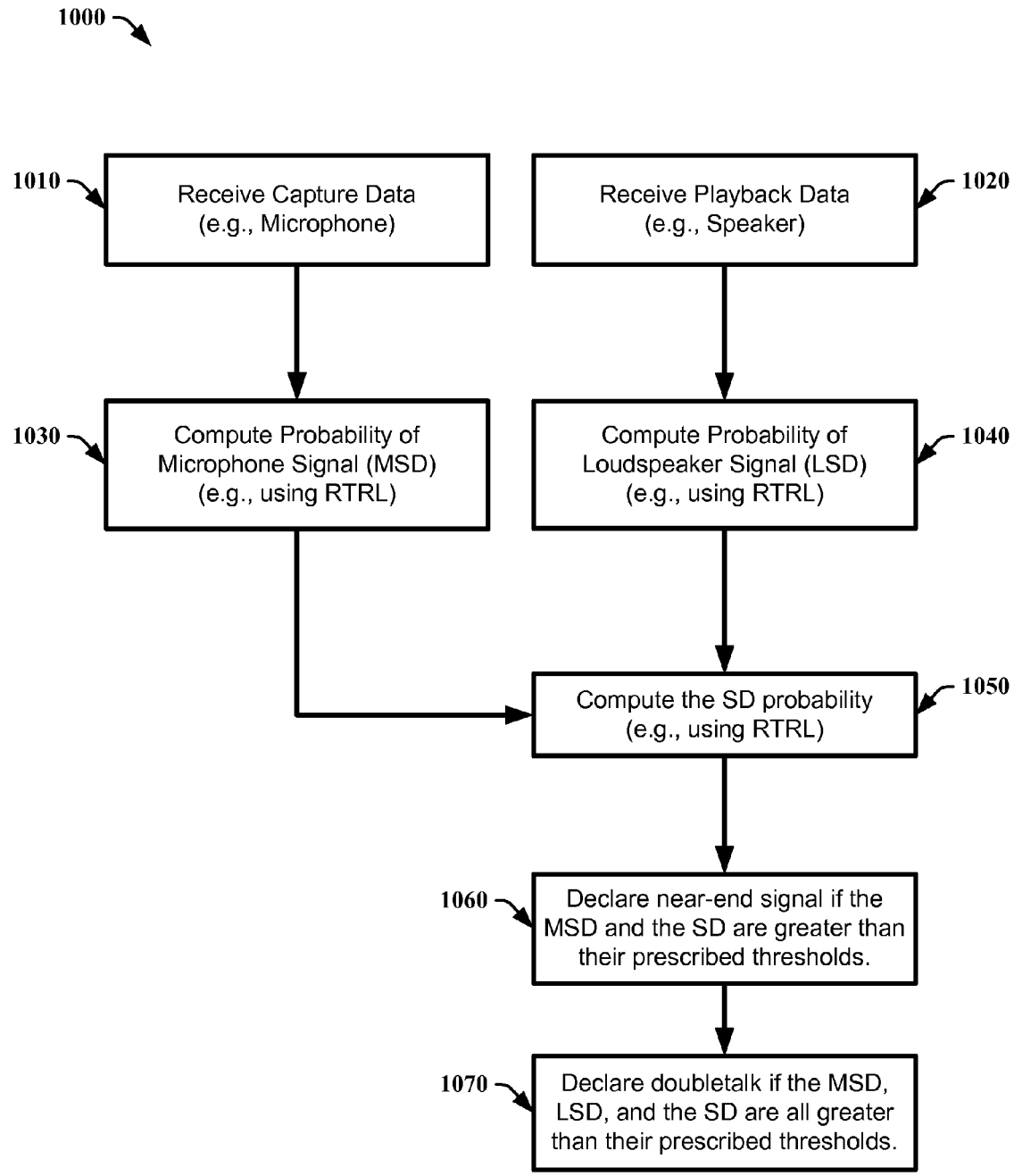
FIG. 10 is a flowchart representing one example of a method of detecting doubletalk.

FIG. 10 is a flow diagram of one example of a method of detecting doubletalk. At steps 1010 and 1020 capture data (e.g., a microphone signal) and playback data (e.g., a loudspeaker signal) are received. The probability of a microphone signal (e.g., speech, music) in the capture data, the probability of a loudspeaker signal (e.g., speech, music, video game sounds) in the playback data and the probability that the capture data is dominated by the near-end signal relative to the loudspeaker echo are computed at steps 1030-1050. By way of example, computing the probabilities can be accomplished by estimating a probability at least in part based on a past state of a recurrent network (e.g., a real time recurrent learning network).

At step 1060, a near-end signal can be declared present in the current frame of data if the probability that the microphone signal is present is greater than its prescribed threshold and if the probability that the capture data is dominated by the microphone signal relative to loudspeaker echo is greater than its prescribed threshold. At step 1070, doubletalk can be declared present in a current frame of capture data if all of the computed probabilities for the current frame are greater than their prescribed thresholds. Although the steps 1010-1070 of the method 1000 are illustrated in FIG. 10 as occurring in an order, the steps 1010-1070 can be performed in any suitable order. For instance, steps 1010 and 1020 can occur in parallel or sequentially as can steps 1060 and 1070, with step 1060 occurring either before or after or in parallel to step 1070.

Figure 11:
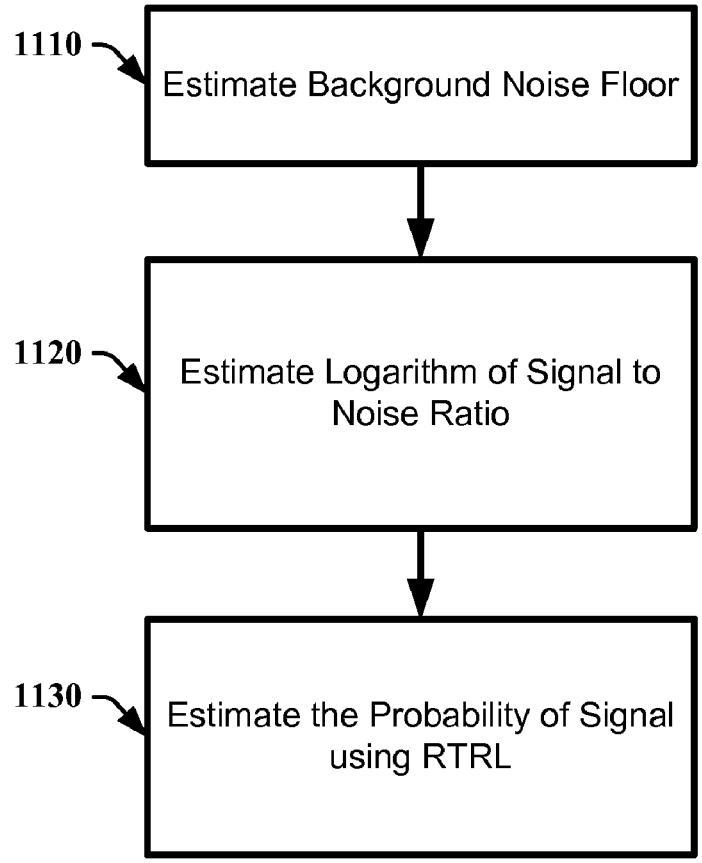
FIG. 11 is a flowchart representing one example of computing the probability of a signal.

FIG. 11 is a flow diagram of one example of a method 1100 of computing the probability of (e.g., detecting ) a signal. At step 1110, the background noise floor is estimated and at step 1120, the logarithm of the signal-to-noise ratio (SNR) is estimated. The probability of the near-end signal then can be estimated at step 1130 based on the estimated background noise floor and the estimated logarithm of the signal-to-noise ratio, for instance, as described above by employing a RTRL network with SNR-based feature set as its input. By way of example, the SNR-based input features can be the logarithm of the estimated posterior SNR of the capture data (e.g., when the output of the RTRL network is the probability of the near-end signal) or of the playback data (e.g., when the output of the RTRL network is the probability of the loudspeaker signal). The probability that the capture data is dominated by the near-end signal relative to the loudspeaker echo (not shown) can be computed, for instance, based on the logarithm of the ratio of the capture data power to the playback data power as described above (e.g., the logarithm of the ratio of the capture data instantaneous power to the playback instantaneous power for each frequency bin per frame). As is the case with FIG. 10, the steps of FIG. 11 can be performed in any suitable order and in sequence or in parallel if suitable.

Figure 12:
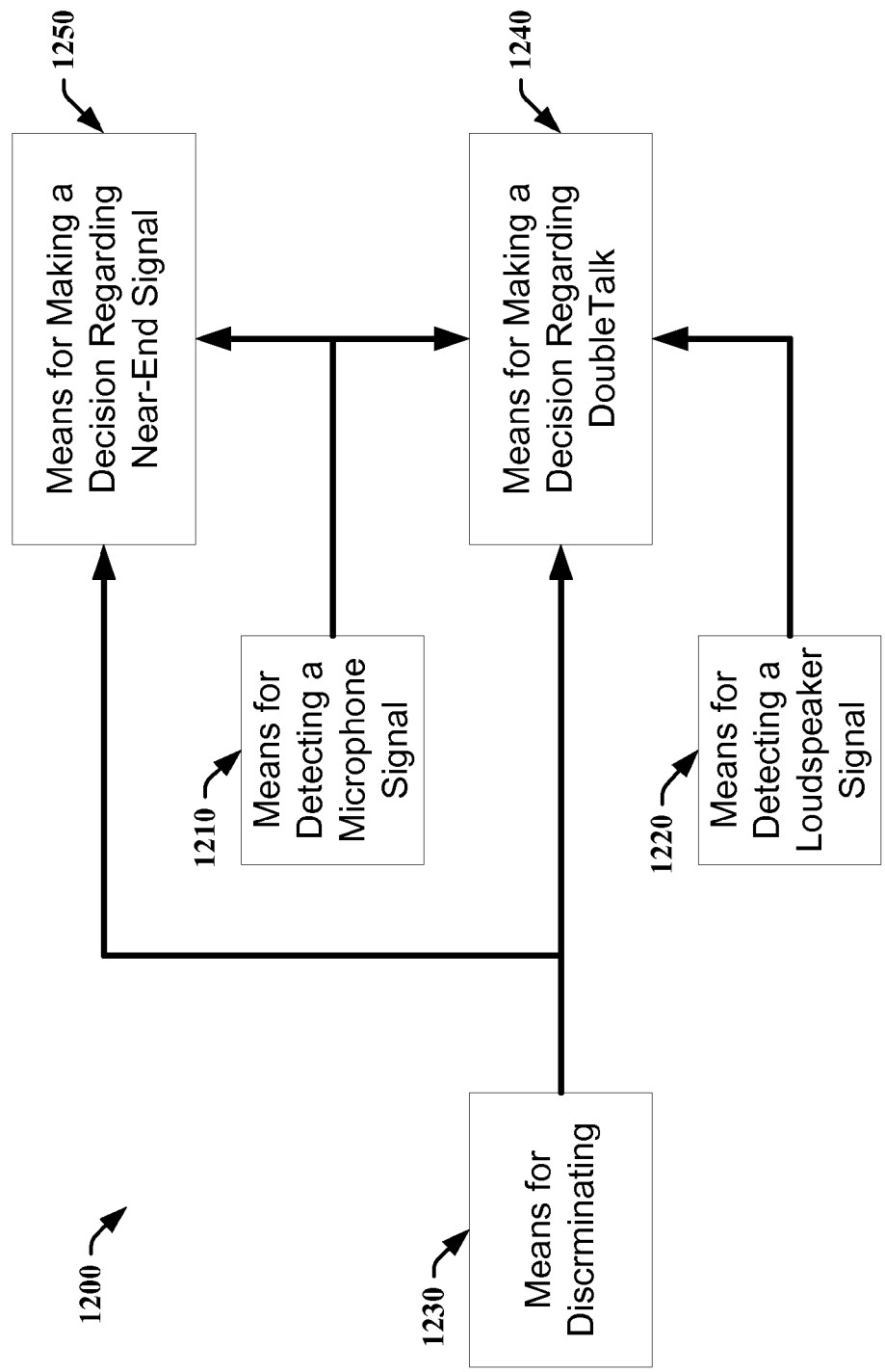
FIG. 12 is a block diagram of one example of a system for detecting doubletalk.

FIG. 12 is a block diagram of a system 1200 for confirming doubletalk. The system 1200 can include means for detecting a microphone signal 1210, means for detecting a loudspeaker signal 1220, means for discriminating the level of the near-end signal 1230, means for making a decision regarding doubletalk 1240 and means for making a decision regarding a near-end signal 1250. The means for making a decision regarding doubletalk 1240 can make its decision by evaluating the outputs of the means for detecting the microphone signal 1210, the means for detecting the loudspeaker signal 1220 and the means for discriminating the level of the near-end signal 1230. The means for making a decision regarding the near-end signal 1250 can make its decision by evaluating the outputs of the means for detecting the microphone signal 1210 and the means for discriminating the level of the near-end signal 1230. The means 1210, 1220 can be configured in any suitable manner, such as those described above (e.g., RTRL network that receives an input relating to the logarithm of a signal-to-noise ratio and outputs a probability, a single layer network with recurrent feedback, etc.). By way of example, the means for detecting 1210, 1220 can be implemented in the frequency domain. Similarly, the means for discriminating 1230 can be configured in any suitable manner, such as those described above (e.g., RTRL network that receives an input relating to the logarithm of a power ratio and outputs a probability, a single layer network with recurrent feedback, etc.). The means for making a decision 1240, 1250 can be configured in any suitable manner, such as those described above (e.g., comparing probabilities to a threshold value).

The systems 900, 1200 described above can be implemented in whole or in part by electromagnetic signals. These manufactured signals can be of any suitable type and can be conveyed on any type of network. For instance, the systems 900, 1200 can be implemented by electronic signals propagating on electronic networks, such as the Internet. Wireless communications techniques and infrastructures also can be utilized to implement the systems 900, 1200.

As used in this application, the term "component" is intended to refer to a computer-related entity, either hardware, a combination of hardware and software, software, or software in execution. For example, a component can be, but is not limited to, a process running on a processor, a processor, an object, an executable, a thread of execution, a program, and a computer. By way of illustration, an application running on a server and/or the server can be a component. In addition, a component can include one or more subcomponents. One or more components can reside within a process and/or thread of execution and a component can be localized on one computer and/or distributed between two or more computers.

The methods 1000, 1100 can be implemented by computer-executable instructions stored on one or more computer-readable media or conveyed by a signal of any suitable type. The methods 1000, 1100 can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods 1000, 1100 can be repeated any number of times as needed and the steps of the methods can be performed in any suitable order. For instance, although step 1060 of the method 1000 is shown as before step 1070 in FIG. 10, step 1070 can be performed before or in parallel with step 1060.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the methods and systems described herein can be practiced with all computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

In regard to the various functions performed by the above described components, computer-executable instructions, means, systems and the like, the terms are intended to correspond, unless otherwise indicated, to any functional equivalents even though the functional equivalents are not structurally equivalent to the disclosed structures. To the extent that the terms "includes," and "including" and variants thereof are used in either the specification or the claims, these terms are intended to be inclusive in a manner the same as the term "comprising." Furthermore, any use of the conjunctions "or" and "and" are intended to be non-exclusive. Accordingly, the claimed subject matter is intended to embrace all such alterations, modifications, and variations that fall within the spirit and scope of the appended claims.

What is claimed is:
1. A system comprising:

a microphone signal detector configured to produce an output indicative of a presence of a signal at a microphone;
a loudspeaker signal detector configured to produce an output indicative of a presence of a signal at a speaker;
a signal discriminator (SD) configured to distinguish between a presence of a near-end signal at the microphone and a loudspeaker echo of the signal at the speaker and produce an output indicative of a relative level of the near-end signal at the microphone and the loudspeaker echo;
a decision component configured to confirm:
a presence of doubletalk at the microphone by comparing:
the output of the microphone signal detector to a microphone threshold value;
the output of the loudspeaker signal detector to a loudspeaker threshold value; and
the output of the SD to a SD threshold value; and
a presence of the near-end signal at the microphone by comparing:
the output of the microphone signal detector to the microphone threshold value; and
the output of the SD to the SD threshold value; and
an acoustic echo canceller (AEC) to suppress the loudspeaker echo captured by the microphone, wherein the decision component is further configured to stop or disable adaption of filter coefficients of the AEC when:
the output of the microphone signal detector exceeds the microphone threshold value, the output of the loudspeaker signal detector is less than the loudspeaker threshold value and the output of the SD exceeds the SD threshold value; or
the output of the microphone signal detector exceeds the microphone threshold value, the output of the loudspeaker signal detector exceeds the loudspeaker threshold value and the output of the SD exceeds the SD threshold value.

2. The system of claim 1, the decision component further configured to confirm a low probability of the presence of the signal at the speaker by comparing the output of the loudspeaker signal detector to the loudspeaker threshold value or to another threshold value.

3. The system of claim 1, the microphone signal detector, the loudspeaker signal detector and the signal discriminator including real time recurrent learning networks.

4. The system of claim 3, wherein the microphone signal detector and the loudspeaker signal detector receive inputs relating to a logarithm of an estimated posterior signal-to-noise ratio.

5. The system of claim 4, wherein the microphone signal detector and the loudspeaker signal detector employ a minima tracker to track a noise floor.

6. The system of claim 3, wherein the signal discriminator receives an input relating to a logarithm of a ratio of microphone signal power to loudspeaker signal power.

7. The system of claim 1, the microphone signal detector, the loudspeaker signal detector and the signal discriminator including networks having feedback.

8. The system of claim 7, the microphone signal detector, the loudspeaker signal detector and the signal discriminator employing stochastic gradient descent to train the networks to the minimize cross-entropy error.

9. The system of claim 1, the microphone signal detector, the loudspeaker signal detector and the signal discriminator each being configured to base current decisions at least in part on past state.

10. The system of claim 1, wherein the microphone signal detector and the loudspeaker signal detector are frequency domain signal detectors.

11. A method for detecting doubletalk, the method comprising:
receiving capture data;
receiving playback data;
computing a probability that a near-end signal is present in a microphone signal in a current frame of the capture data;
computing a probability that a loudspeaker signal is present in a current frame of the playback data;
computing a probability that the current frame of the capture data is dominated by the near-end signal relative to a loudspeaker echo of the loudspeaker signal that is output from a loudspeaker;
declaring that near-end signal is present in the current frame of the capture data if the probability that the near-end signal is present is greater than a prescribed microphone threshold and if the probability that the current frame of the capture data is dominated by the near-end signal relative to the loudspeaker echo is greater than a prescribed signal discrimination threshold; and
declaring that doubletalk is present in the current frame of the capture data if the probability that the near-end signal is present is greater than the prescribed microphone threshold, if the probability that the current frame of the capture data is dominated by the near-end signal relative to the loudspeaker echo is greater than the prescribed signal discrimination threshold and if the probability that the loudspeaker signal is present is greater than the prescribed loudspeaker threshold.

12. The method of claim 11, wherein computing the probability that the near-end signal is present in the current frame of the capture data comprises estimating a background noise floor, estimating a logarithm of a signal-to-noise ratio and estimating the probability that the near-end signal is present based on the estimated background noise floor and the estimated logarithm of the signal-to-noise ratio.

13. The method of claim 11, wherein computing the probability that the loudspeaker signal is present in the current frame of the playback data comprises estimating a background noise floor, estimating a logarithm of a signal-to-noise ratio and estimating the probability the loudspeaker signal is present based on the estimated background noise floor and the estimated logarithm of the signal-to-noise ratio.

14. The method of claim 11, wherein computing the probability that the current frame of the capture data is dominated by the near-end signal relative to the loudspeaker echo comprises estimating the probability that the current frame of the capture data is dominated by the near-end signal relative to the loudspeaker echo based on a logarithm of a ratio of the capture data power to the playback data power.

15. The method of claim 11, further comprising declaring a low probability that a loudspeaker signal is present in the current frame of the playback data if the probability of the loudspeaker signal is less than its prescribed threshold or another prescribed threshold.

16. The method of claim 11, wherein computing the probabilities comprises real time recurrent learning.

17. A system comprising:
a microphone signal detector for detecting a microphone signal;
a loudspeaker signal detector for detecting a loudspeaker signal;
a signal discriminator for discriminating a level of a near-end signal by determining an amount of the microphone signal that is dominated by the near-end signal relative to an echo of the loudspeaker signal that is output from a loudspeaker;

a decision component for making a decision regarding: doubletalk by evaluating outputs of:
- the microphone signal detector relative to a corresponding threshold;
- the loudspeaker signal detector relative to a corresponding threshold; and
- the signal discriminator relative to a corresponding threshold; and near-end signal by evaluating outputs of:
- the microphone signal detector relative to a corresponding threshold; and
- the signal discriminator relative to a corresponding threshold.

18. The system of claim 17, wherein the microphone signal detector and the loudspeaker signal detector receive inputs relating to a logarithm of a signal-to-noise ratio and their outputs are probabilities.

19. The system of claim 17, wherein the microphone signal and the loudspeaker detector are implemented in the frequency domain.

20. The system of claim 17, the microphone signal detector, the loudspeaker signal and the signal discriminating including single layer networks with recurrent feedback.

* * * * *